Patented Nov. 18, 1941

2,262,935

UNITED STATES PATENT OFFICE 2,262,935

THERMODECOMPOSITION OF DICYANDIAMIDE

William H. Hill, Mount Lebanon, Pa., and John M. Grim, Stamford, Conn., assignors to American Cyanamid Company, New York, N. Y., a corporation of Maine No Drawing. Application March 23, 1940, Serial No. 325,611

8 Claims. (Cl. 260—248)

This invention relates to the production of aminotriazine mixtures by the heat treatment of dicyandiamide.

An object of this invention is to prepare materials from dicyandiamide by thermo-decomposition which will be reactive with aldehydes such as formaldehyde to produce resinous and similar compounds having desirable properties.

This and other objects are attained by heating dicyandiamide in the presence of an inorganic ammonium salt, either by direct fusion of the two substances or by heating a suspension or solution of the substances in one or more materials which are liquid at about 150° C. and at least one of which preferably boils between 180° C. and about 250° C., the heating being at a temperature and for a time sufficient to liberate a substantial amount of ammonia.

The following examples in which the proportions are in parts by weight are given by way of illustration and not in limitation.

Example 1

| | Parts |
|---|---|
| Diacyandiamide | 126 |
| Ammonium nitrate | 80 |

This mixture which melts at about 150° C. is heated in an open vessel surrounded by an oil bath. Decomposition occurs only very slowly at temperatures below about 200° C. but when the temperature rises to about 265° C., very rapid decomposition takes place with the formation of an infusible solid. During this decomposition a substantial amount of ammonia, e. g. 0.1–0.2 mol per mol of dicyandiamide is liberated. This solid material is ground to about 100 mesh and treated with concentrated aqueous ammonium hydroxide and subsequently filtered to separate the ammonium nitrate from the mixed aminotriazine products which have been formed. These mixed aminotriazine products are suitable for reaction with formaldehyde to produce resinous materials.

Example 2

| | Parts |
|---|---|
| Dicyandiamide | 252 |
| Ammonium nitrate | 80 |
| Naphthalene | 750 |

This mixture is heated in a suitable reaction container provided with a reflux condenser. The mixture of dicyandiamide and ammonium nitrate melts at about 150° C. The reaction is carried out by refluxing the naphthalene (at about 218° C.) for about one hour during which time the molten mixture of dicyandiamide and ammonium nitrate is converted into a solid mass. The naphthalene is poured off and the solid mass heated for an additional hour at about 250° C.

The solid mass is cooled and ground to about 100 mesh. It is treated with an excess of concentrated aqueous ammonium hydroxide to convert the salts which may be formed back to the free bases. The mixture is filtered and the filtrate is evaporated to recover the ammonium nitrate which may be used over again.

The filter cake is a substantially water insoluble white powder which may be reacted with formaldehyde or other aldehydes in the manner described in our copending application Serial Number 325,612 filed March 23, 1940, and entitled "the Manufacture of aminotriazine-aldehyde condensation products."

Example 3

| | Parts |
|---|---|
| Diacyandiamide | 126 |
| Ammonium sulphate | 66 |

This mixture is heated to about 250° C., at which temperature it is maintained for about thirty minutes. During this time the clear liquid melt changes to a white solid. It is cooled, washed with concentrated aqueous ammonium hydroxide and the mixed aminotriazine product is recovered in the same general manner as described in Example 1. The resulting material is suitable for reaction with aldehydes such as formaldehyde to produce resinous material which in their hardened form have good color and good chemical resistance.

Example 4

| | Parts |
|---|---|
| Dicyandiamide | 252 |
| Ammonium chloride | 53.5 |
| Naphthalene | 750 |

This mixture is reacted in the same general manner as described in Example 2, the naphthalene separated and the mixed aminotriazine product which is obtained is recovered in the same general manner. This material may be reacted with formaldehyde to produce light colored and water-resistant resinous materials.

Example 5

| | Parts |
|---|---|
| Dicyandiamide | 252 |
| Ammonium sulfamate | 98 |
| Naphthalene | 750 |

This mixture is reacted in the same general manner as in Example 2 for about thirty minutes, the naphthalene separated and the mixed aminotriazine product is recovered all in the same general manner as described in Example 2. The product is suitable for the manufacture of aldehyde condensation products similar to the condensation products obtained from the other types of mixed aminotriazines described above.

Examples of other inorganic ammonium salts which may be substituted for all or part of those used in the above examples are: ammonium bromide, ammonium iodide, ammonium phosphate, etc.

If ammonium salts be used which decompose below the decomposition temperatures of dicyandiamide, the reaction may be conducted in suitable autoclaves under pressure.

The proportion of dicyandiamide to the inorganic ammonium salt may be varied over a relatively wide range. It has been found that about 3 mols of dicyandiamide to about 1 mol of the ammonium salt is particularly suitable.

The reaction may be conducted either with or without a liquid heating medium such as naphthalene, phenol, aniline, quinoline, etc. Furthermore, organic ammonium salts may be used in admixture with the inorganic ammonium salts, e. g. ammonium thiocyanate, ammonium oxalate, ammonium succinate, ammonium phthalate, etc. In some instances, for example, if ammonium succinate and ammonium phthalate be used, these substances need not be separated from the thermo-decomposition product produced. Since they contain a source of polybasic acid, they may be reacted with a polyhydric alcohol as well as with an aldehyde to produce a mixed or composite alkyd-aminoplastic resin.

The reaction of the dicyandiamide suspended or dissolved in a molten inorganic ammonium salt may be conducted in reaction vessels which are heated directly or in reaction vessels in which the temperature of reaction is controlled by a heat exchange medium which surrounds the reaction vessel itself, and optionally the heat exchange medium may be circulated.

The reaction is carried out at a temperature at which the dicyandiamide decomposes and gives off a substantial quantity of ammonia. Generally temperatures ranging between about 150° C. and 275° C. are suitable but the temperature is preferably selected between about 200° C. and 250° C.

Mixed aminotriazine products can be formed by our process which are substantially white solids, which have a wide range of solubility in hot water and which apparently contain little or none of the higher deamination products of dicyandiamide such as mellon. Some of our new products are also devoid of most of the impurities which are usually obtained by the thermodecomposition of dicyandiamide which tend to cause discoloration in the aldehyde condensation products made therefrom.

Our mixed aminotriazine products are utilized in the production of resins by condensation with aldehydes for use in the various technical application of such materials, for instance, in the preparation of adhesives, laminated materials, textile treating materials, castings, coating compositions, and for the production of molding compounds. Our products are particularly useful in the production of the mixture which is formed by the thermo-decomposition of dicyandiamide under the conditions set forth herein in that the different reactivities of the various components of the mixture balance in such a way that improved results are obtained as compared with the use of any one of the constituents of the mixture singly. Our products have the further advantage that they are extremely economic to produce in that generally no expensive equipment is required. Furthermore, the reaction time involved in the process is relatively short.

Obviously many modifications and variations in the process as set forth above may be made without departing from the spirit and scope of the invention as defined in the appended claims.

We claim:

1. A process of preparing a mixture suitable for reaction with aldehydes to produce substantially infusible, substantially insoluble synthetic resins and containing at least one aminotriazine which comprises heating between about 200 and 250° C. about 3 mols of dicyandiamide in an aldehyde-free medium which is liquid at about 150° C. and which includes about 1 mol of an inorganic ammonium salt, the heating being for a time sufficient to liberate a substantial amount of ammonia.

2. A process of preparing a mixture suitable for reaction with aldehydes to produce substantially infusible, substantially insoluble synthetic resins and containing at least one aminotriazine which comprises heating between about 200 and 250° C. about 3 mols of dicyandiamide in an aldehyde-free medium which is liquid at about 150° C. and which includes about 1 mol of an inorganic ammonium salt together with a substance which boils at the temperature at which the heating is conducted, the heating being for a time sufficient to liberate a substantial amount of ammonia.

3. A process of preparing a mixture suitable for reaction with aldehydes to produce substantially infusible, substantially insoluble synthetic resins and containing at least one aminotriazine which comprises heating about 3 mols of dicyandiamide in an aldehyde-free medium which is liquid at about 150° C. and which includes about 1 mol of an inorganic ammonium salt at the boiling point of the medium, the heating being for a time sufficient to liberate a substantial amount of ammonia.

4. A process of preparing a mixture suitable for reaction with aldehydes to produce substantially infusible, substantially insoluble synthetic resins and containing at least one aminotriazine which comprises heating at about 218° C. about 3 mols of dicyandiamide in an aldehyde-free medium which is liquid at about 150° C. and which includes about 1 mol of an inorganic ammonium salt together with naphthalene, the heating being for a time sufficient to liberate a substantial amount of ammonia.

5. A process of preparing a mixture suitable for reaction with aldehydes to produce substantially infusible, substantially insoluble synthetic resins and containing at least one aminotriazine which comprises heating between about 200 and 250° C. about 3 mols of dicyandiamide in an aldehyde-free medium which is liquid at about 150° C. and which includes about 1 mol of ammonium chloride, the heating being for a time sufficient to liberate a substantial amount of ammonia.

6. A process of preparing a mixture suitable for reaction with aldehydes to produce substantially infusible, substantially insoluble synthetic resins and containing at least one aminotriazine which comprises heating between about 200 and 250° C. about 3 mols of dicyandiamide in an aldehyde-free medium which is liquid at about 150° C. and which includes about 1 mol of ammonium sulfate, the heating being for a time sufficient to liberate a substantial amount of ammonia.

7. A process of preparing a mixture suitable for reaction with aldehydes to produce substantially infusible, substantially insoluble synthetic resins and containing at least one aminotriazine which comprises heating between about 200 and 250° C. about 3 mols of dicyandiamide in an aldehyde-free medium which is liquid at about 150° C. and which includes about 1 mol of ammonium sulfamate, the heating being for a time sufficient to liberate a substantial amount of ammonia.

8. A thermo-decomposition product of dicyandiamide suitable for reaction with aldehydes to produce substantially infusible, substantially insoluble synthetic resins which is obtained by the method of claim 1.

WILLIAM H. HILL.
JOHN M. GRIM.